W. LOUGHRIDGE.
Car Brake.
No. 12,685.  Patented Apr. 10, 1855.
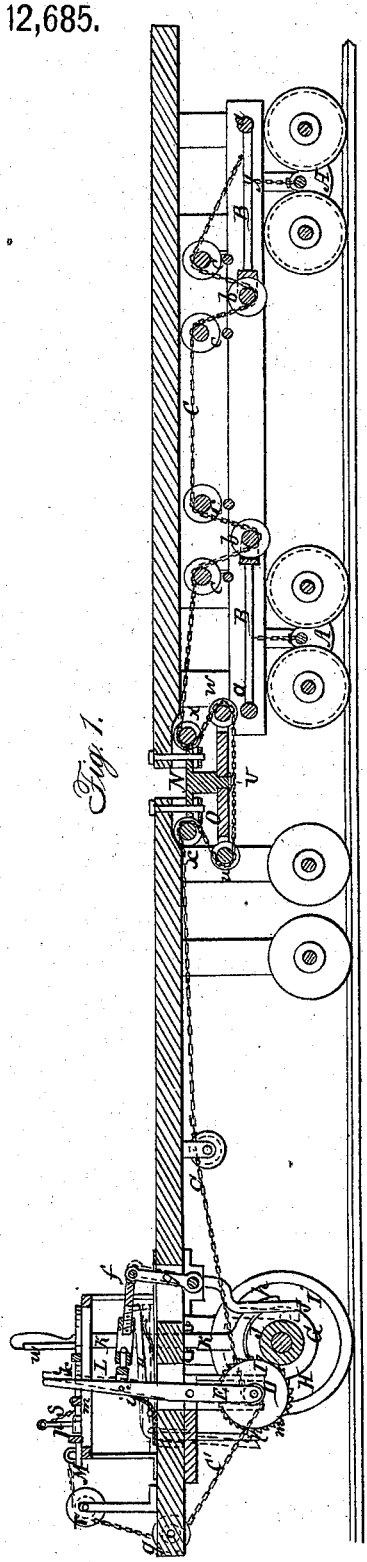
Fig. 1.
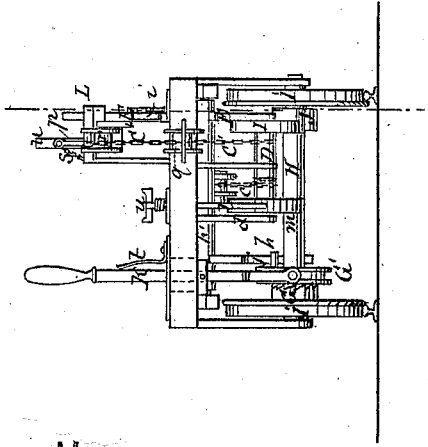
Fig. 3.
Fig. 4.
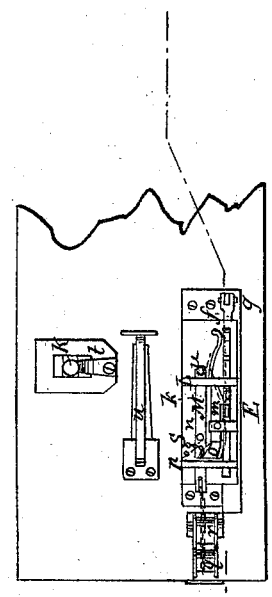
Fig. 2.

UNITED STATES PATENT OFFICE.

WILLIAM LOUGHRIDGE, OF WEVERTON, MARYLAND.

GRADUATING THE TENSION OF CAR-BRAKES.

Specification of Letters Patent No. 12,685, dated April 10, 1855.

*To all whom it may concern:*

Be it known that I, WILLIAM LOUGH-RIDGE, of Weverton, in the county of Washington and State of Maryland, have invented certain new and useful Improvements in Apparatus for Applying the Brakes on Railroads; and I do hereby declare that the following is a full, clear, and exact description of the same, reference being had to the accompanying drawings, forming part of this specification, in which—

Figure 1 is a longitudinal section of part of the platforms of a locomotive and car with my improvements applied. Fig. 2 is a plan of the mechanism by which the brakes are thrown into and out of operation. Fig. 3 is a front view of the said mechanism. Fig. 4 is a plan of the coupling and the appliances connected therewith for the purpose of keeping the cars apart during the application of the brakes.

Similar letters of reference indicate corresponding parts in the several figures.

This invention relates to the operation of the brakes of a single car or all the brakes of a train by the force of the momentum of the car or train, acting to cause a chain or cord to be wound up on a barrel to draw simultaneously upon all the brakes, and consists in a mechanism applied to any ordinary chain brake, for the purpose of graduating the power to any degree of tension that may be previously desired, and then causing the said power to be automatically disengaged from the driving axle, the desired amount of pressure upon the brakes thus obtained being firmly and steadily maintained at the pleasure of the engineer as is hereafter fully explained.

To enable those skilled in the art to make and use my invention I will proceed to describe its construction and operation.

A, A, are the brakes which are suspended from or otherwise connected with levers B, B, working on fulcra $a$, $a$, in the trucks of the cars. The ends of these levers are furnished with pulleys $b$, $b$. The brake chain $c$ is connected at its rear end either with the hindmost brake lever or with some fixed part of the car truck, but I prefer to attach it to the hindmost brake lever between its fixed fulcrum $a$, and the point $y$, where it connects with the brake as by that means I insure the action of the brakes of the hindmost car before those of any other which is very desirable; and it passes over pairs of pulleys $c$, $c$, hung from the bottom of the car, and under or partly around the pulleys $b$, $b$, of the brake levers, the pairs of pulleys $c$, $c$, being so arranged that the chain in passing from one to the other of each pair passes one of the brake lever pulleys $b$, as shown in Fig. 1. The effect of this mode of applying the chain to the levers is similar to that of a block and tackle, giving a double purchase to the brake levers.

The chain is attached at a suitable distance from its front end to the barrel D, which is hung in suitable bearings under the locomotive or tender so as to be under the control of the engineer or under the first car to be within the control of a person stationed for the purpose. I prefer to attach the chain barrel to the locomotive to be within the control of the engineer. The bearing for the journal at one end of the chain barrel is in a fixed hanger $d$, but the bearing for the other end is in the lower part of an upright lever E, which works on a fixed fulcrum. The other part of this lever is connected by a link $f$, with the upper lever arm $g$, on a rock shaft E, hung below the platform, the said shaft carrying a lower lever arm $j$, which hangs in such a position as to be struck by the revolution of a pin or wiper $h$, attached to the loose part G, of a clutch G, G', on the axle H, which is the axle intended to transmit the force to the brakes, and may be supposed to be either the crank or driving axle of the locomotive or any other axle of the locomotive or of a car. The other part G', of the clutch G, G', is attached to one of the wheels I', I', or otherwise secured to the axle H. The chain barrel D, carries at the end which is hung in the lever E, a wheel I, whose periphery is turned smoothly and the axle, H, either carries a similar wheel J, opposite to it or has the periphery of the hub of one of the driving wheels turned smooth and true for the purpose, when the wheel I, is brought in contact with it by the movement of the lever E, of giving motion to the barrel to wind up the chain by the friction of the two smooth peripheries.

The lever E, when the brakes are not desired to be in operation, is caused by the action of a spring $i$, to hold the wheel I, clear of the wheel J, and the brakes are all kept clear of the wheels by the weight of their levers B, B, which aid the weight of the chain in drawing down the slack of the latter. But when it is desired to set the brakes in operation, the engineer or person in charge, throws the clutch G, G', in gear by a lever K, conveniently arranged for that purpose, and the part G, of the clutch commences to rotate with the axle H. During the first revolution of the axle after the clutch is in gear, the pin h, strikes and throws back the lower lever arm j, of the rockshaft E, and by throwing the upper lever arm g, in the opposite direction acts upon the lever E, and moves it to engage the wheel I, of the chain barrel with the wheel J, of the axle H. As soon as the lever E, arrives in position for the wheels to engage, its upper part is caught by a spring catch k, attached to a frame L, above the platform of the engine and car. The chain barrel, being set in motion, commences winding up the chain to actuate the brakes. The clutch G, G', only requires to be in gear during one revolution of the axle H, which will occupy an inconceivable short space of time so that the lever K, may be instantly released and be left free for the clutch to be uncoupled by the action of a spring t, applied to the lever, though no injury will be done by the clutch remaining in gear, as when the pin h, has thrown back the arm j, it will merely wipe it slightly in repassing in its subsequent revolutions.

As soon as the chain is wound up sufficiently to apply the desired amount of force to the brakes, it is necessary to stop the winding of it up, as it is obvious that if allowed to continue winding, either the revolution of the axle H, must stop or the chain must break. To accomplish this I at the proper time disengage the wheels I, and J, by releasing the lever E, from the catch k, and leave it free to the action of the spring i, but all the force applied to the chain is retained by a pawl l, acting on a ratchet wheel m, on the chain barrel. The liberation of the lever from the catch k, is effected by the following manner. The catch is at one end of a lever m', working on a fulcrum n, on the frame L. At the opposite end of the lever, there is an inclined projecting piece o, on one side, and on the top of the framing L, there is a longitudinal slider M, working in suitable guides. To the above slider the brake chain after passing over two pulleys q, r, is connected by its front end and when the barrel is set in motion to wind up that part C, of the chain which operates the brakes, it also winds up the part C', connecting the slider with the barrel, and draws forward the slider and causes a pin p, which is inserted in a hole in the slider, to pass in contact with the inclined face on the catch lever m, and to move the catch to liberate the lever E. The slider M, contains several holes into either of which the pin p, is placed for the purpose above described. The position of the pin farther forward or backward causes it to act on the catch lever m, sooner or later to set free the lever E, to disengage the wheels I and J, and thus applies the brakes with a less or greater force. The pin p, is attached to a chain s, secured to the frame L, and, until it is desired to apply the brakes, is not inserted in the slider, M, but the engineer or person in charge of the brakes before throwing the clutch in gear inserts the pin into such of the holes in the slider as will cause the proper degree of force to be applied to the brakes, which practice will enable him to determine. In case of expected collision the pin should be inserted in the most backward hole so as not to disengage the wheels I, J, till the greatest strain the chain is capable of sustaining with safety has been applied to it. In entering a station, the pin should be placed farther forward. In slackening speed when going faster than is desired it should be placed still farther forward. When the brakes are to be released it is only necessary for the engineer or person in charge to place his foot upon a lever u, to which the pawl l, is attached and press down slightly to throw out the pawl from the ratchet and liberate the chain barrel when the chain will run off slack by reason of its own weight. It may be well to observe that the chain C', instead of being a part of the brake chain may be separate therefrom, and in that case the brake chain may be connected at its extremity to the barrel.

The slider M, is represented as being furnished with a handle u, for the purpose of drawing it back after the brakes have been liberated, but it may be furnished with a spring by which it may be always held back when the chain is slack.

As it is necessary that the lever E, should always be moved precisely to the required position for the catch k, to seize it. I have furnished the link which connects it with the upper lever arm of the rock shaft F, from which it derives its movement with a screw and a swivel nut u, by which its length can be regulated with great precision.

In order to make the brake operative both in running forward and backward there should be two ratchet wheels on the chain barrel having their teeth set in opposite directions, and their two pawls should be so arranged that either can be readily thrown in and the other out of gear at the same time.

The car coupling which I employ consists of a link N, of the usual kind but I attach to the under side of this link by a pivot v, at the center a strong iron bar O, somewhat longer than the coupling. Each end of this bar carries a pulley w, and under each car as close as possible to the coupling I attach another pulley x. The brake chain in passing from one car to another passes over the pulleys $x$, and under the pulleys $w, w$, as shown in Fig. 1, and by that means when there is any tension on the brake chain it is tending to force the cars apart, and will prevent the possibility of injury by their crowding together.

I am aware that various arrangements of self acting brake have been proposed, in which the power obtained from the locomotive axle, by means of an engaging and disengaging mechanism has been applied throughout a train by the use of a chain or is equivalent. Such a brake therefore I do not claim; but What I do claim as my invention and desire to secure by Letters Patent, is—

The combination and arrangement of the sliding plate M, having a series of holes graduated for limiting its play by an adjustable pin, the supplementary chain C', wound upon the chain barrel D which receives the chain for actuating the brakes, the lever E for bringing the said barrel into and out of action, the spring catch K for holding the said lever E in engagement, until tripped by the pin of the aforesaid sliding plate M, when the lever E is released, and the power is maintained without any further increase; the whole constituting an automatic disengaging apparatus capable of being graduated so as to apply and retain any degree of frictional pressure that may be previously desired, by the simple adjustment of the movable pin in the sliding plate, substantially as herein described.

WM. LOUGHRIDGE.

Witnesses:
I. W. COOMBS,
J. G. MASON.